US010893549B2

(12) United States Patent
Yamada et al.

(10) Patent No.: US 10,893,549 B2
(45) Date of Patent: Jan. 12, 2021

(54) METHOD PERFORMED BY USER EQUIPMENT, METHOD PERFORMED BY EVOLVED NODE B, USER EQUIPMENT, AND EVOLVED NODE B

(71) Applicant: SHARP KABUSHIKI KAISHA, Sakai (JP)

(72) Inventors: Shohei Yamada, Sakai (JP); Shoichi Suzuki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/090,208

(22) PCT Filed: Feb. 28, 2017

(86) PCT No.: PCT/JP2017/007779
§ 371 (c)(1),
(2) Date: Sep. 29, 2018

(87) PCT Pub. No.: WO2017/169461
PCT Pub. Date: Oct. 5, 2017

(65) Prior Publication Data
US 2019/0124699 A1    Apr. 25, 2019

Related U.S. Application Data

(60) Provisional application No. 62/315,174, filed on Mar. 30, 2016.

(51) Int. Cl.
| | |
|---|---|
| *H04W 4/00* | (2018.01) |
| *H04W 74/08* | (2009.01) |
| *H04L 27/26* | (2006.01) |
| *H04L 5/00* | (2006.01) |
| *H04W 84/04* | (2009.01) |

(52) U.S. Cl.
CPC ......... *H04W 74/0866* (2013.01); *H04L 27/26* (2013.01); *H04W 74/0841* (2013.01); *H04L 5/0053* (2013.01); *H04W 84/042* (2013.01)

(58) Field of Classification Search
CPC ......... H04W 74/0866; H04W 74/0841; H04W 84/042; H04L 27/26; H04L 5/0053
(Continued)

(56) References Cited

U.S. PATENT DOCUMENTS

2016/0044642 A1   2/2016  Xu et al.
2017/0202054 A1*  7/2017  Rathonyi .......... H04W 52/0216
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.2.0 (Dec. 2015).
(Continued)

*Primary Examiner* — Chuong T Ho
(74) *Attorney, Agent, or Firm* — ScienBiziP, P.C.

(57) ABSTRACT

A method performed by a user equipment (UE) is described. The method includes performing a random access procedure in a first downlink frequency resource and/or a first uplink frequency resource; in the random access procedure, monitoring an NPDCCH in the first downlink frequency resource; detecting an NPDCCH in the first downlink frequency resource; transmitting, to an evolved Node B (eNB), a narrowband physical uplink shared channel (NPUSCH) on a second uplink frequency resource based on detection of the NPDCCH on the first downlink frequency resource, in a case that the NPDCCH contains an uplink (UL) grant for contention resolution; and receiving, from the evolved Node B (eNB), a narrowband physical downlink shared channel (NPDSCH) on a second downlink frequency resource based on detection of the NPDCCH on the first downlink frequency resource, in a case that the NPDCCH contains a downlink (DL) assignment for contention resolution.

4 Claims, 9 Drawing Sheets

(58) Field of Classification Search
USPC .................................. 370/328, 329, 330
See application file for complete search history.

(56) References Cited

U.S. PATENT DOCUMENTS

| | | | |
|---|---|---|---|
| 2017/0230961 A1* | 8/2017 | Park | H04L 5/0055 |
| 2018/0287846 A1* | 10/2018 | Kim | H04L 27/2662 |
| 2018/0367278 A1* | 12/2018 | Chatterjee | H04W 4/70 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321 V13.0.0 (Dec. 2015).

Ericsson, "Nb-IoT—Remaining issues for random access procedure", R1-161836, 3GPP TSG-RAN WG1 NB-IoT Ad-Hoc Meeting Sophia Antipolis, France, Mar. 22-24, 2016.

Qualcomm Incorporated, "New Work Item: NarrowBand IoT (NB-IoT)", RP-151621, 3GPP TSG RAN Meeting #69, Phoenix, USA, Sep. 14-16, 2015.

Ericsson, "NB-IoT—NB-PDCCH design", 3GPP TSG-RAN1—RAN1 #84, St. Julian, Malta, Feb. 15-19, 2016.

HTC, "Cross-carrier scheduling of Msg4 on SCell to resolve RA", R2-105823, 3GPP TSG-RAN WG2 Meeting #71bis, Oct. 11-15, 2010, Xi'an, PRC.

Intel Corporation, "Remaining details of NB-IoT multi-carrier operation", R1-161893, 3GPP TSG RAN WG1 NB-IoT Ad-Hoc Meeting, Sophia Antipolis, France, Mar. 22-24, 2016, XP051081010.

* cited by examiner

METHOD PERFORMED BY USER EQUIPMENT, METHOD PERFORMED BY EVOLVED NODE B, USER EQUIPMENT, AND EVOLVED NODE B

CROSS REFERENCE TO RELATED APPLICATIONS

This Nonprovisional application claims priority under 35 U.S.C. § 119 on Patent Application No. 62/315,174 filed in United States of America on Mar. 30, 2016, the entire contents of which are hereby incorporated by reference.

TECHNICAL FIELD

The present disclosure relates generally to communication systems. More specifically, the present disclosure relates to systems and methods for random access procedure.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility, low complexity and efficiency have been sought. However, improving communication capacity, speed, flexibility, low complexity and efficiency may present certain problems.

For example, wireless communication devices may communicate with one or more devices using multiple connections. However, the multiple connections may only offer limited flexibility and efficiency. As illustrated by this discussion, systems and methods that improve communication flexibility and efficiency may be beneficial.

SUMMARY OF INVENTION

A method performed by a user equipment (UE) is described. The method includes performing a random access procedure in a first downlink frequency resource and/or a first uplink frequency resource; in the random access procedure, monitoring an NPDCCH in the first downlink frequency resource; detecting an NPDCCH in the first downlink frequency resource; transmitting, to an evolved Node B (eNB), a narrowband physical uplink shared channel (NPUSCH) on a second uplink frequency resource based on detection of the NPDCCH on the first downlink frequency resource, in a case that the NPDCCH contains an uplink (UL) grant for contention resolution; and receiving, from the evolved Node B (eNB), a narrowband physical downlink shared channel (NPDSCH) on a second downlink frequency resource based on detection of the NPDCCH on the first downlink frequency resource, in a case that the NPDCCH contains a downlink (DL) assignment for contention resolution.

A method performed by an evolved Node B (eNB) is described. The method include performing a random access procedure in a first downlink frequency resource and/or a first uplink frequency resource; in the random access procedure, transmitting, to a user equipment (UE), an NPDCCH in the first downlink frequency resource; receiving, from the user equipment (UE), a narrowband physical uplink shared channel (NPUSCH) on a second uplink frequency resource based on the NPDCCH on detection of the first downlink frequency resource, in a case that the NPDCCH contains an uplink (UL) grant for contention resolution; and transmitting, to the user equipment (UE), a narrowband physical downlink shared channel (NPDSCH) on a second downlink frequency resource based on detection of the NPDCCH on the first downlink frequency resource, in a case that the NPDCCH contains a downlink (DL) assignment for contention resolution.

A user equipment (UE) is described. The UE includes a processor and a memory in electronic communication with the processor. Instructions stored in the memory are executable to perform a random access procedure in a first downlink frequency resource and/or a first uplink frequency resource; in the random access procedure, monitor an NPDCCH in the first downlink frequency resource; and detect an NPDCCH in the first downlink frequency resource; and transmit, to an evolved Node B (eNB), a narrowband physical uplink shared channel (NPUSCH) on a second uplink frequency resource based on detection of the NPDCCH on the first downlink frequency resource, in a case that the NPDCCH contains an uplink (UL) grant for contention resolution; and receive, from the evolved Node B (eNB), a narrowband physical downlink shared channel (NPDSCH) on a second downlink frequency resource based on detection of the NPDCCH on the first downlink frequency resource, in a case that the NPDCCH contains a downlink (DL) assignment for contention resolution.

An evolved Node B (eNB) is described. The eNB includes a processor and a memory in electronic communication with the processor. Instructions stored in the memory are executable to perform a random access procedure in a first downlink frequency resource and/or a first uplink frequency resource; in the random access procedure, transmit, to a user equipment (UE), an NPDCCH in the first downlink frequency resource; receive, from the user equipment (UE), a narrowband physical uplink shared channel (NPUSCH) on a second uplink frequency resource corresponding to a fourth physical resource block based on detection of the NPDCCH on the first downlink frequency resource, in a case that the NPDCCH contains an uplink (UL) grant for contention resolution; and transmit, to the user equipment (UE), a narrowband physical downlink shared channel (NPDSCH) on a second downlink frequency resource based on detection of the NPDCCH on the first downlink frequency resource, in a case that the NPDCCH contains a downlink (DL) assignment for contention resolution.

DESCRIPTION OF EMBODIMENTS

Figure 1:
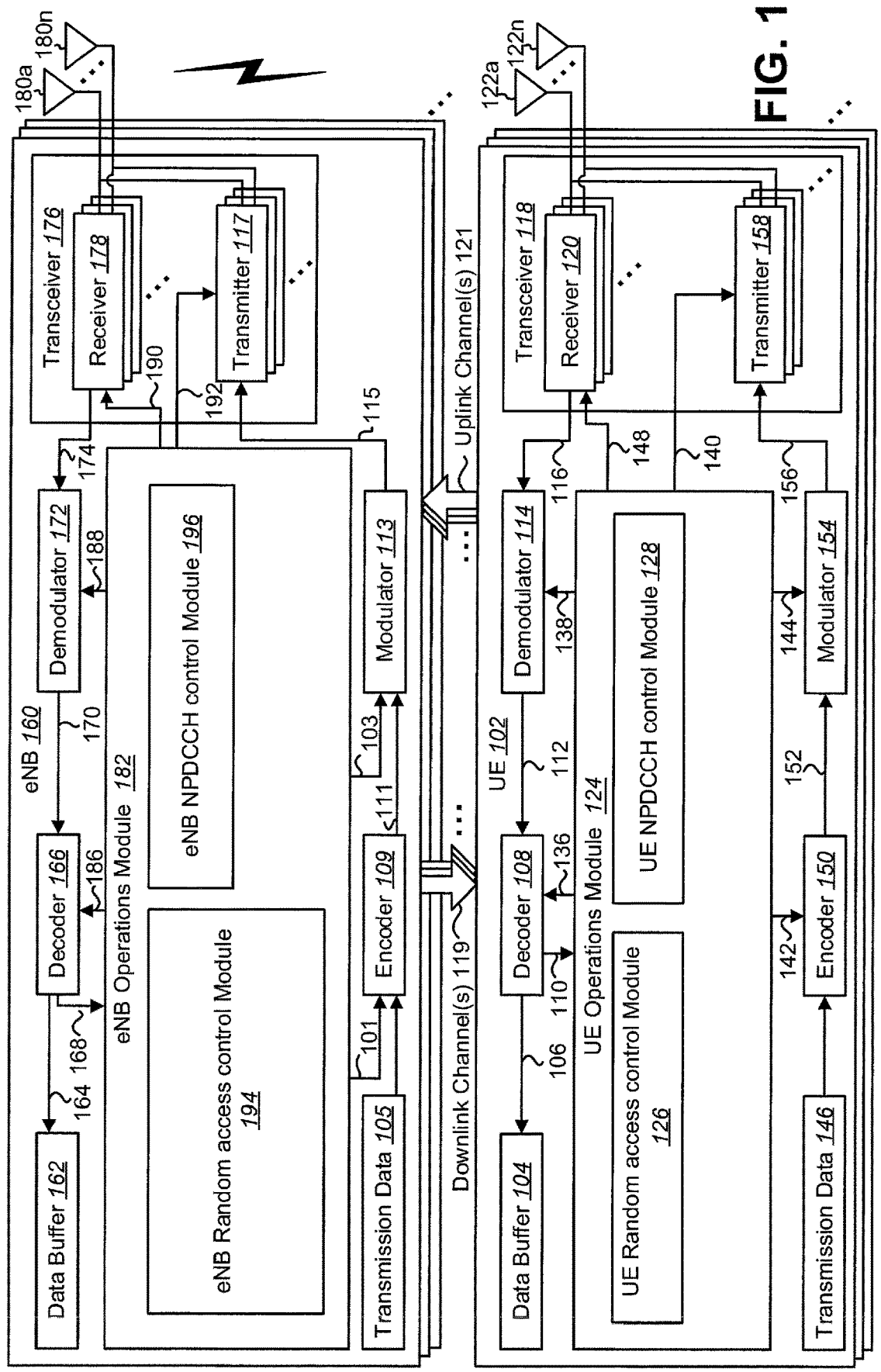
FIG. 1 is a block diagram illustrating one configuration of one or more evolved Node Bs (eNBs) and one or more user equipments (UEs) in which systems and methods for random access procedure may be implemented.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A), LTE-Advanced Pro, and other standards (e.g., 3GPP Releases 8, 9, 10, 11, 12, 13, and/or 14, and/or Narrow Band-Internet of Things (NB-IoT)). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE (User Equipment), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, one example of a "base station" is an access point. An access point may be an electronic device that provides access to a network (e.g., Local Area Network (LAN), the Internet, etc.) for wireless communication devices. The term "communication device" may be used to denote both a wireless communication device and/or a base station.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods described herein may enhance the efficient use of radio resources in Carrier aggregation operation. Carrier aggregation refers to the concurrent utilization of more than one component carrier (CC). In carrier aggregation, more than one cell may be aggregated to a UE. In one example, carrier aggregation may be used to increase the effective bandwidth available to a UE. In traditional carrier aggregation, a single eNB is assumed to provide multiple serving cells for a UE. Even in scenarios where two or more cells may be aggregated (e.g., a macro cell aggregated with remote radio head (RRH) cells) the cells may be controlled (e.g., scheduled) by a single eNB. However, in a small cell deployment scenario, each node (e.g., eNB, RRH, etc.) may have its own independent scheduler. To maximize the efficiency of radio resources utilization of both nodes, a UE may connect to two or more nodes that have different schedulers. The systems and methods described herein may enhance the efficient use of radio resources in dual connectivity operation. A UE may be configured multiple groups of serving cells, where each group may have carrier aggregation operation (e.g., if the group includes more than one serving cell).

Instead of having lots of features in a UE, the system and method described herein may enhance the accommodation of UEs with new type or new category which have limited features (e.g. specific UEs). Especially, such UEs may be efficient for Machine-Type Communications (MTC), but it is noted that it is not limited to MTC use case. The provision of Machine-Type Communications (MTC) via cellular networks is proving to be a significant opportunity for new revenue generation for mobile operators. "Low cost & enhanced coverage MTC UE for LTE" in Release 12 specified a low complexity LTE device for MTC with Bill of Material cost approaching that of an Enhanced General Packet Radio Service (EGPRS) modem using a combination of complexity reduction techniques. However, results from the study indicated that further complexity reduction of LTE devices for MTC can be achieved if additional complexity reduction techniques are supported.

In addition, the study in Release 12 concluded that a coverage improvement target of 15-20 dB for both Frequency Division Duplex (FDD) and Time Division Duplex (TDD) in comparison to normal LTE footprint could be achieved to support the use cases where MTC devices are deployed in challenging locations, e.g. deep inside buildings, and to compensate for gain loss caused by complexity reduction techniques.

The general objective is to specify a new UE in LTE Release 13 that also allows for enhanced coverage compared to existing LTE networks and low power consumption, with the following detailed objectives (enhanced MTC (eMTC)). It may be to specify a new low complexity UE category/type for MTC operation in any LTE duplex mode (full duplex FDD, half duplex FDD, TDD) based on the Rel-12 low complexity UE category/type supporting the following additional capabilities. It may be to reduce UE bandwidth of 1.4 MHz (i.e., 6 Physical Resource Blocks (PRBs)) in downlink and uplink. It may be a bandwidth reduced UEs should be able to operate within any system bandwidth. It may be frequency multiplexing of bandwidth reduced UEs and non-MTC UEs should be supported. It may be that the UE only needs to support 1.4 MHz RF (radio frequency) bandwidth in downlink and uplink. The present disclosure relates especially to how low complexity, bandwidth reduced and/or coverage enhanced UEs (e.g. specific UEs, MTC UEs, Bandwidth reduced Low complexity (BL) UEs, coverage enhanced (CE) UEs) can be accommodated in current and future LTE system.

As described in RP-151621, the discussion on Narrowband-IoT (Internet of Things) (NB-IoT) in Release 13 in addition to Release 13 eMTC was started. The aim was to study both the possibility of evolving current GERAN (GSM (global system for mobile communications) EDGE Radio Access Network) system and the design of a new access system towards low complexity and low throughput radio access technology to address the requirements of cellular internet of things. The objectives of the study (i.e., evaluation before a work) were: improved indoor coverage, support for massive number of low throughput devices, low delay sensitivity, ultra-low device cost, low device power consumption and (optimized) network architecture. The objective of the work of NB-IoT is to specify a radio access for cellular internet of things, based to a great extent on a non-backward-compatible variant of E-UTRA, that addresses improved indoor coverage, support for massive number of low throughput devices, low delay sensitivity, ultra low device cost, low device power consumption and (optimized) network architecture. NB-IoT may support 3 different modes of operation:

1. 'Stand-alone operation' utilizing for example the spectrum currently being used by GERAN systems as a replacement of one or more GSM carriers
2. 'Guard band operation' utilizing the unused resource blocks within a LTE carrier's guard-band
3. 'In-band operation' utilizing resource blocks within a normal LTE carrier In particular, the following may be supported:
180 kHz UE RF bandwidth for both downlink and uplink OFDMA on the downlink
Two numerology options may be considered for inclusion: 15 kHz sub-carrier spacing (with normal or extended CP) and 3.75 kHz sub-carrier spacing.
A single synchronization signal design for the different modes of operation, including techniques to handle overlap with legacy LTE signals
MAC, RLC, PDCP and RRC procedures based on existing LTE procedures and protocols and relevant optimizations to support the selected physical layer This NB-IoT system may introduce various numerologies (e.g., subcarrier spacing, symbol times, and Fast Fourier Transform (FFT) size). One of 5th generation (5G) cellular system may target on accommodating such various numerologies in one system to achieve various type of data, services or traffic, etc. Hereafter, although a term "NB-IoT" system is used, it may include various types of systems that accommodate various types of physical structures (e.g., radio access network (RAN) slicing). This NB-IoT system may also be considered as a new Radio Access Technology (RAT) or one of 5G RAT, apart from LTE or LTE-A. In such NB-IoT system, to support for massive number of low throughput devices, it is efficient that system information and dedicated RRC signaling overhead are significantly reduced.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one configuration of one or more evolved Node Bs (eNBs) 160 and one or more user equipments (UEs) 102 in which systems and methods for accommodating specific UEs may be implemented. The one or more UEs 102 may communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

It should be noted that in some configurations, one or more of the UEs 102 described herein may be implemented in a single device. For example, multiple UEs 102 may be combined into a single device in some implementations. Additionally or alternatively, in some configurations, one or more of the eNBs 160 described herein may be implemented in a single device. For example, multiple eNBs 160 may be combined into a single device in some implementations. In the context of FIG. 1, for instance, a single device may include one or more UEs 102 in accordance with the systems and methods described herein. Additionally or alternatively, one or more eNBs 160 in accordance with the systems and methods described herein may be implemented as a single device or multiple devices.

The UE 102 and the eNB 160 may use one or more channels 119, 121 to communicate with each other. For example, a UE 102 may transmit information or data to the eNB 160 using one or more uplink channels 121 and signals. Examples of uplink channels 121 for non NB-IoT include a physical uplink control channel (PUCCH), a physical random access channel (PRACH), and a physical uplink shared channel (PUSCH), etc. Examples of uplink channels 121 for NB-IoT include a narrowband physical uplink shared channel (NPUSCH), and a narrowband physical random access channel (NPRACH), etc. Examples of uplink signals for non NB-IoT include a demodulation reference signal (DMRS) and a sounding reference signal (SRS), etc. Examples of uplink signals for NB-IoT include a narrowband demodulation reference signal (NDMRS) and a narrowband sounding reference signal (NSRS), etc. The one or more eNBs 160 may also transmit information or data to the one or more UEs 102 using one or more downlink channels 119 and signals, for instance. Examples of downlink channels 119 for non NB-IoT include a PDCCH, a PDSCH, etc. Examples of downlink channels 119 for NB-IoT include a narrowband physical downlink control channel (NPDCCH), a narrowband physical downlink shared channel (NPDSCH), and a narrowband physical broadcast channel (NPBCH) etc. Examples of downlink signals for non NB-IoT include a primary synchronization signal (PSS), a secondary synchronization signal (SSS), a cell-specific reference signal (CRS), and a channel state information (CSI) reference signal (CSI-RS), etc. Examples of downlink signals for NB-IoT include a narrowband primary synchronization signal (NPSS), a narrowband secondary synchronization signal (NSSS), and a narrowband reference signal (NRS), etc. Other kinds of channels or signals may be used. A downlink narrowband physical channel may correspond to a set of resource elements carrying information originating from higher layers. NB-IoT may allow access to network services via E-UTRA with a channel bandwidth limited to 180 kHz (corresponding to one physical resource block (PRB)). A transmitted signal on one antenna port in each slot may be described by a resource grid of size one resource block as defined in clause 6.2.3 in 3GPP TS36.211.

In NB-IoT, the UE 102 may receive or transmit only within 180 kHz corresponding to one PRB (e.g., one for downlink, the other for uplink) but the UE may be configured with another PRB (e.g., one for downlink, the other for uplink) in addition to a PRB of which channel bandwidth is used for NPSS, NSSS, and/or NPBCH, etc. (e.g., for downlink) for the UE 102 and/or a PRB of which channel bandwidth is used for NPRACH, etc. (e.g., for uplink) for the UE 102. This operation may be referred to as NB-IoT multi-carrier operation. The PRB of which channel bandwidth (e.g., a first downlink frequency resource) is used for NPSS, NSSS, and/or NPBCH, etc. (e.g., for downlink) for the UE 102 and/or a PRB of which channel bandwidth is used for NPRACH, etc. (e.g., for uplink) for the UE 102 may be alternatively referred to as a first PRB, NB-IoT carrier, anchor PRB, a first frequency resource corresponding to a first PRB, a first downlink frequency resource corresponding to a first PRB, a first uplink frequency resource corresponding to a third PRB, etc. Another PRB (e.g., one for downlink, the other for uplink) which is configured via dedicated RRC signaling may be alternatively referred to as a second PRB, a non-anchor PRB, a configured PRB, a second frequency resource corresponding to a second PRB, a second downlink frequency resource corresponding to a second PRB, a second uplink frequency resource corresponding to a fourth PRB, etc.

The UE 102 in RRC_IDLE may camp on the NB-IoT carrier on which the UE 102 has received NB-PSS/SSS, NB-PBCH and SIB transmissions. The UE 102 in RRC_CONNECTED can be configured, via dedicated RRC signaling, to a PRB (e.g., one for downlink, the other for uplink), for all unicast transmissions (not intended to excluding single cell point to multipoint (SC-PTM), if supported), different than the NB-IoT carrier (e.g., one for downlink, the other for uplink) on which the UE 102 has received NB-PSS/SSS, NB-PBCH and SIB transmissions. If the different PRB (e.g., one for downlink, the other for uplink) is not configured for the UE 102, all transmissions occur on the NB-IoT carrier (e.g., one for downlink, the other for uplink) on which the UE 102 has received NB-PSS/SSS, NB-PBCH and SIB transmissions. The UE 102 is not expected to receive NB-PBCH, and NB-PSS/SSS and any transmissions other than unicast transmissions in the configured PRB (e.g., one for downlink, the other for uplink). PRACH is supported on anchor PRB in uplink.

For a first mode ("Data transfer over Non-Access Stratum (NAS)"), a non-anchor PRB can be configured when an RRC connection is established (e.g., when Message 4 (Msg.4) is received in a random access procedure, when the RRC connection setup message is received). For a second mode ("Access Stratum (AS) context caching"), a non-anchor PRB (e.g., one for downlink, the other for uplink) can be configured when an RRC connection is (re)established, resumed or reconfigured.

Configurations of a non-anchor PRB (e.g., one for downlink, the other for uplink) may be included within the Information Element (IE) radioResourceConfigDedicated in a RRC message (e.g., radio resource configuration dedicated). After the successful completion of RRC connection (re)establishment, resume or reconfiguration, if configured, the UE 102 can start to receive NPDCCH/NPDSCH and/or transmit NPUSCH on a non-anchor PRB.

A UE that has been assigned a non-anchor PRB, may remain on that PRB throughout RRC_CONNECTED or until transmission of NPRACH is needed in RRC_CONNECTED or until re-assigned to another PRB. The RA procedure is performed on an anchor PRB. The RRC connection (re)establishment/resume procedure may be initiated on an anchor PRB. After the Hybrid Automatic Repeat Request (HARQ) acknowledgement for Msg.4, UE may start monitoring a non-anchor PRB and Msg.5 may be delivered on a non-anchor PRB. If the UE 102 needs to perform a random access (RA) procedure while on the non-anchor carrier (e.g. due to a scheduling request (SR) or PDCCH order), it may go back to the anchor carrier and may stay there throughout RRC_CONNECTED or until re-assigned to another PRB. Alternatively, if the UE 102 needs to perform a random access (RA) procedure while on the non-anchor carrier (e.g. due to a scheduling request (SR) or PDCCH order), it may go back to the anchor carrier and may go back to the non-anchor PRB after the RA procedure.

Each of the one or more UEs 102 may include one or more transceivers 118, one or more demodulators 114, one or more decoders 108, one or more encoders 150, one or more modulators 154, one or more data buffers 104 and one or more UE operations modules 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals (e.g., downlink channels, downlink signals) from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals (e.g., uplink channels, uplink signals) to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may include a UE Random access control module 126 and a UE NPDCCH control module 128. In some implementations, the UE operations module 124 may include physical (PHY) entities, Medium Access Control (MAC) entities, Radio Link Control (RLC) entities, packet data convergence protocol (PDCP) entities, and a Radio Resource Control (RRC) entity.

The UE operations module 124 may provide the benefit of monitoring NPDCCH and performing a random access procedure efficiently. The UE Random access control module 126 may provide performing a random access procedure efficiently. The UE NPDCCH control module 128 may provide monitoring an NPDCCH efficiently.

The UE operations module 124 may provide information 148 to the one or more receivers 120. For example, the UE operations module 124 may inform the receiver(s) 120 when or when not to receive transmissions based on the Radio Resource Control (RRC) message (e.g., broadcasted system information, RRC connection reconfiguration message), MAC control element, and/or the DCI (Downlink Control Information).

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, one or more data buffers 162 and one or more eNB operations modules 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals (e.g., uplink channels, uplink signals) from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals (e.g., downlink channels, downlink signals) to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PUSCH transmission data) that may be used by the eNB operations module 182 to perform one or more operations.

In general, the eNB operations module 182 may enable the eNB 160 to communicate with the one or more UEs 102. The eNB operations module 182 may include an eNB Random access control module 194 and an eNB NPDCCH control module 196. The eNB operations module 182 may include PHY entities, MAC entities, RLC entities, PDCP entities, and an RRC entity.

The eNB operations module 182 may provide the benefit of transmitting NPDCCH efficiently and performing a random access procedure efficiently. The eNB Random access control module 194 may provide performing a random access procedure efficiently. The eNB NPDCCH control module 196 may provide transmitting a NPDCCH efficiently.

The eNB operations module 182 may provide information 190 to the one or more receivers 178. For example, the eNB operations module 182 may inform the receiver(s) 178 when or when not to receive transmissions based on the RRC message (e.g., broadcasted system information, RRC connection reconfiguration message), MAC control element, and/or the DCI (Downlink Control Information).

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

In general, the eNB operations module 182 may enable the eNB 160 to communicate with one or more network nodes (e.g., a mobility management entity (MME), serving gateway (S-GW), eNBs). The eNB operations module 182 may also generate a RRC connection reconfiguration message to be signaled to the UE 102.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
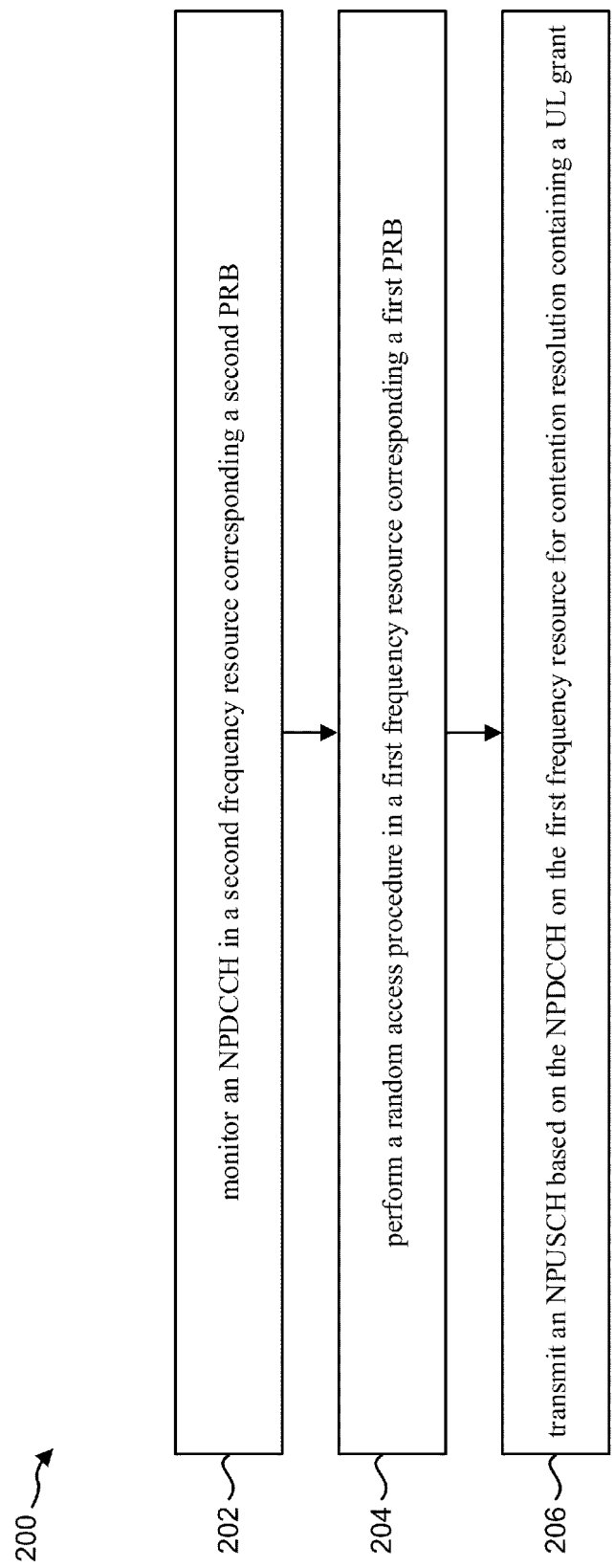
FIG. 2 is a flow diagram illustrating one implementation of a method for a random access procedure by a UE.

FIG. 2 is a flow diagram illustrating one implementation of a method 200 for a random access procedure by a UE 102. The UE 102 may monitor 202 a narrowband physical downlink control channel (NPDCCH) in a second downlink frequency resource corresponding to a second physical resource block (PRB). The UE 102 may perform 204 a random access procedure in a first downlink frequency resource corresponding to a first physical resource block (PRB) and/or a first uplink frequency resource corresponding a third physical resource block (PRB). In the random access procedure, the UE 102 may monitor an NPDCCH in the first downlink frequency resource and may detect an NPDCCH in the first downlink frequency resource. The UE 102 may receive a random access response on the first downlink frequency resource. The UE 102 may transmit, to the eNB 160, the narrowband physical uplink shared channel (NPUSCH) on the first uplink frequency resource based on the uplink (UL) grant which is included in the random access response on the first downlink frequency resource.

The UE 102 may transmit 206, to an evolved Node B (eNB), a narrowband physical uplink shared channel (NPUSCH) (e.g., NPUSCH on a second uplink frequency resource corresponding a forth physical resource block (PRB)) based on the NPDCCH on the first downlink frequency resource, the NPDCCH containing an uplink (UL) grant for contention resolution. The first uplink frequency resource corresponding to the third physical resource block (PRB) may be the same with or different than the first downlink frequency resource corresponding to the first physical resource block (PRB) (e.g., depending on unpaired band (e.g., TDD) or paired band (e.g., FDD), respectively). The second uplink frequency resource corresponding to the forth physical resource block (PRB) may be the same with or different than the second downlink frequency resource corresponding to the second physical resource block (PRB) (e.g., depending on unpaired band (e.g., TDD) or paired band (e.g., FDD), respectively). For the paired band, the second PRB and the fourth PRB may be configured for the UE 102 for a non-anchor PRB for downlink and a non-anchor PRB for uplink respectively.

Figure 3:
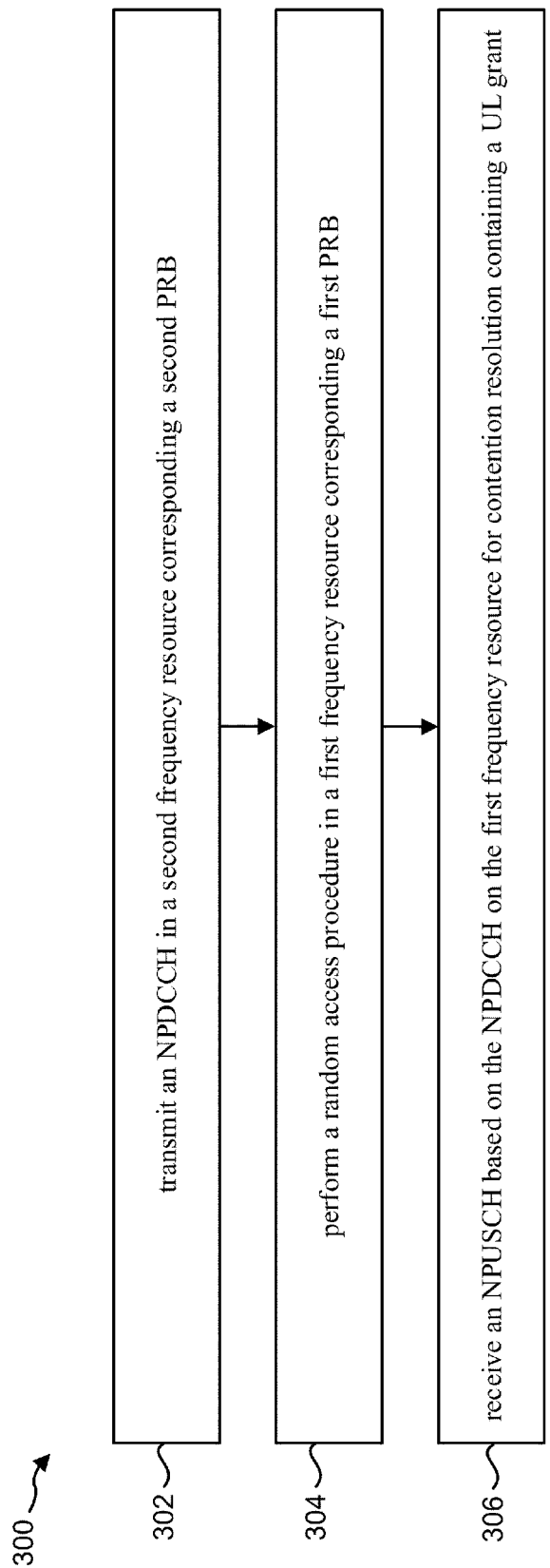
FIG. 3 is a flow diagram illustrating one implementation of a method for a random access procedure by an eNB.

FIG. 3 is a flow diagram illustrating one implementation of a method 300 for a random access procedure by an eNB 160. The eNB 160 may transmit 302, to a user equipment (UE), a narrowband physical downlink control channel (NPDCCH) in a second downlink frequency resource corresponding to a second physical resource block (PRB). The eNB 160 may perform 304 a random access procedure in a first downlink frequency resource corresponding to a first physical resource block (PRB) and/or a first uplink frequency resource corresponding a third physical resource block (PRB). In the random access procedure, the eNB 160 may transmit an NPDCCH in the first downlink frequency resource. The eNB 160 may transmit a random access response on the first downlink frequency resource. The eNB 160 may receive, to the UE 102, the narrowband physical uplink shared channel (NPUSCH) on the first uplink frequency resource based on the uplink (UL) grant which is included in the random access response on the first downlink frequency resource. The eNB 160 may receive 306 a narrowband physical uplink shared channel (NPUSCH) (e.g., NPUSCH on a second uplink frequency resource corresponding a forth physical resource block (PRB)) based on the NPDCCH on the first downlink frequency resource, the NPDCCH containing an uplink (UL) grant for contention resolution. The first uplink frequency resource corresponding to the third physical resource block (PRB) may be the same with or different than the first downlink frequency resource corresponding to the first physical resource block (PRB) (e.g., depending on unpaired band (e.g., TDD) or paired band (e.g., FDD), respectively). The second uplink frequency resource corresponding to the forth physical resource block (PRB) may be the same with or different than the second downlink frequency resource corresponding to the second physical resource block (PRB) (e.g., depending on unpaired band (e.g., TDD) or paired band (e.g., FDD), respectively). For the paired band, the eNB 160 may configure the UE 102 with the second PRB for a non-anchor PRB for downlink and the fourth PRB for a non-anchor PRB for uplink respectively.

Figure 4:
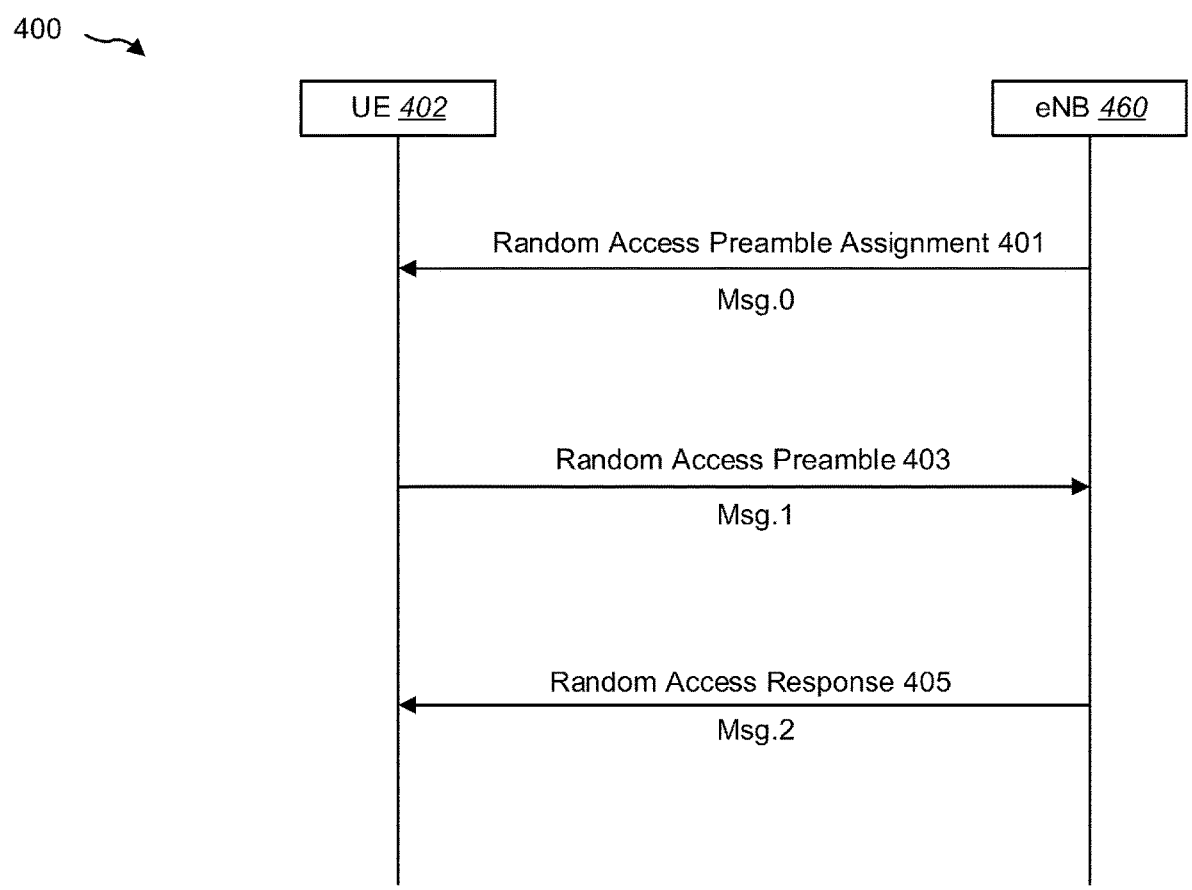
FIG. 4 is a thread diagram illustrating one configuration of a non-contention based random access procedure.

FIG. 4 is a thread diagram illustrating one configuration of a non-contention based random access procedure 400. The eNB 460 may send 401 a random access preamble assignment (e.g., Message 0, Msg.0). For example, the eNB 460 may assign the UE 402 a non-contention random access preamble (e.g., a random access preamble that may not be within a set sent in broadcast signaling). In some implementations, the eNB 460 may assign 401 the random access preamble via a dedicated signaling in a downlink (via a dedicated RACH preamble identity, for example).

The UE 402 may then send 403 the assigned non-contention random access preamble to the eNB 460 (e.g., Message 1, Msg.1). In some implementations, the UE 402 may send 403 the assigned non-contention random access preamble on a RACH in an uplink transmission.

The eNB 460 may then send 405 a random access response to the UE 402 (e.g., Message 2, Msg.2). The random access response may be generated by MAC on DL-SCH. The UE 402 may receive the random access response.

Figure 5:
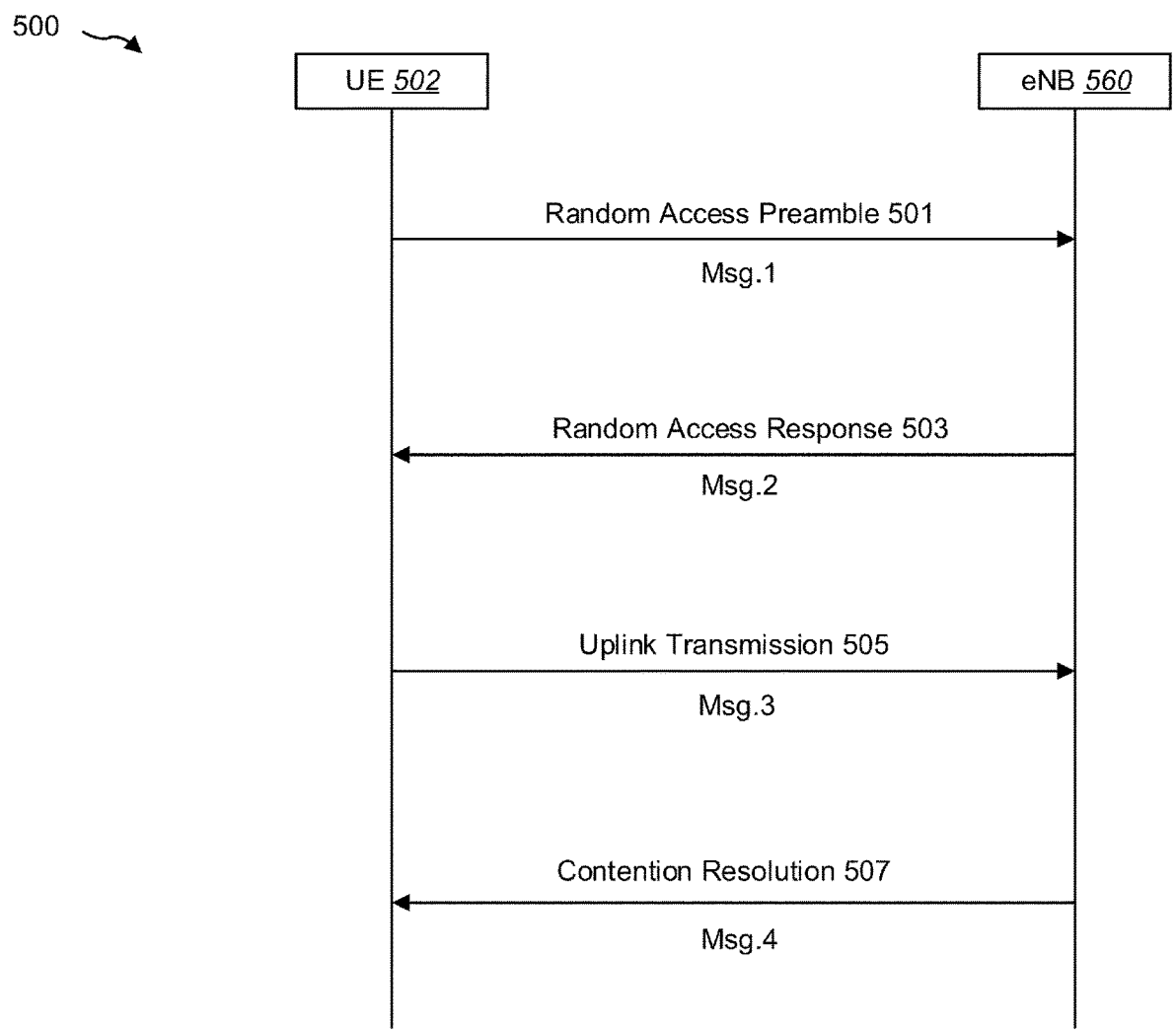
FIG. 5 is a thread diagram illustrating one configuration of a contention-based random access procedure.

FIG. 5 is a thread diagram illustrating one configuration of a contention-based random access procedure 500. The UE 502 may select a random access preamble. For example, the UE 502 may select a random access preamble randomly from a set that may be informed in broadcast signaling. The UE 502 may then send 501 the randomly selected random access preamble to the eNB 560 (on a PRACH or NPRACH in an uplink transmission, for example) (e.g., Message 1, Msg.1).

The eNB 560 may send 503 a random access response (e.g., Message 2, Msg.2). The UE 502 may receive the random access response (RAR). The random access response may include a Temporary C-RNTI. The random access response may be generated by MAC on DL-SCH.

The UE 502 may then send 505 a first scheduled uplink transmission on UL-SCH (e.g., Message 3). In other words, the UE 502 may send 505 an uplink transmission scheduled by the Temporary C-RNTI. Message 3 (e.g., Msg.3, Msg3) is a message transmitted on Uplink Shared Channel(s) (UL-SCH) containing a Cell Radio Network Temporary Identifier (C-RNTI) Medium Access Control (MAC) Control Element (CE) or Common Control Channel (CCCH) Service Data Unit (SDU), submitted from upper layer and associated with the UE Contention Resolution Identity, as part of a random access procedure.

The eNB 560 may send 507 a contention resolution, which may be received by the UE 502 (e.g., Message 4, Msg.4). The contention resolution may include information that confirms that the UE 502 is identified. Contention Resolution may be based on either C-RNTI on PDCCH (e.g., PDCCH, NPDCCH) of a special cell (SpCell) (e.g., primary cell (PCell), primacy secondary cell (PSCell)) or UE Contention Resolution Identity on Downlink Shared Channel(s) (DL-SCH). Once Msg3 is transmitted, the MAC entity of the UE 502 may consider a contention resolution successful in a case of the following condition.

If notification of a reception of a PDCCH (e.g., PDCCH, NPDCCH) transmission is received from lower layers; and if the C-RNTI MAC control element was included in Msg3 (e.g., the RA procedure initiated by PDCCH order or RA procedure initiated by the MAC sub-layer itself or by the RRC sub-layer):

if the Random Access procedure was initiated by the MAC sub-layer of the UE 502 itself or by the RRC sub-layer of the UE 502 and the PDCCH transmission is addressed to the C-RNTI and contains an UL grant for a new transmission; or if the Random Access procedure was initiated by a PDCCH order and the PDCCH transmission is addressed to the C-RNTI:

the MAC entity of the UE 502 may consider a contention resolution successful and consider this Random Access procedure successfully completed.

In FIG. 4 and FIG. 5, random access procedures are generally described but the detail procedure may have some variations.

Figure 6:
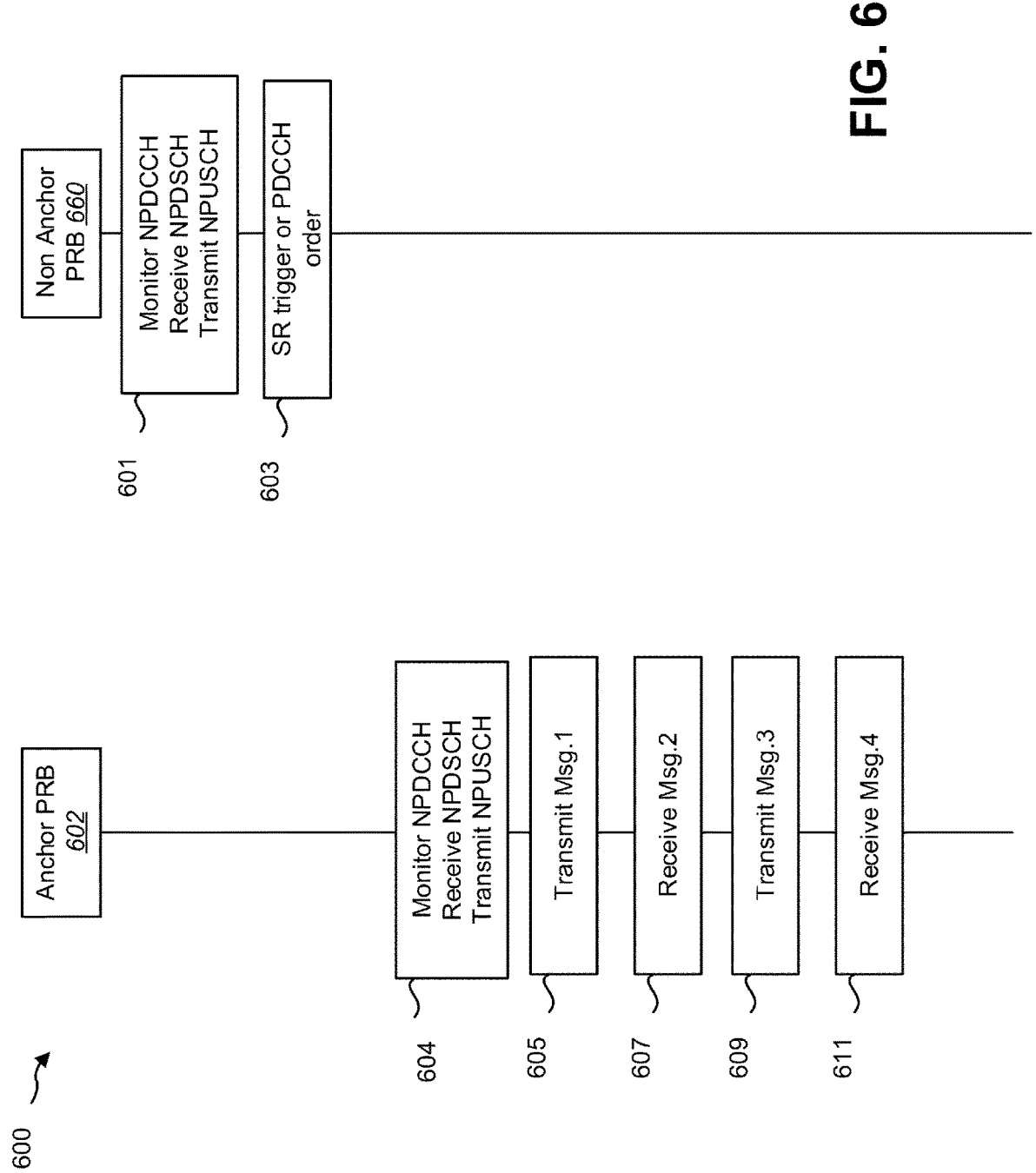
FIG. 6 is a thread diagram illustrating one configuration of a random access procedure in an NB-IoT multi-carrier operation.

FIG. 6 is a thread diagram illustrating one configuration of a random access procedure 600 in an NB-IoT multi-carrier operation. In this procedure, after a random access procedure, the UE 102 may stay an anchor PRB 602 until a non-anchor PRB is assigned via dedicated RRC message. This procedure may be applied to a UE configured to use the second mode ("AS context caching"). This procedure may or may not be applied to a UE configured to use a first mode ("Data transfer over Non-Access Stratum (NAS)"). If the UE 102 is configured with an NB-IoT multi-carrier operation (e.g., configured with the second PRB), the UE 102 may monitor 601 an NPDCCH on a non-anchor PRB 660 (e.g., a non-anchor PRB for downlink), receive an NPDSCH on the non-anchor PRB 660 (e.g., a non-anchor PRB for downlink), and/or transmit an NPUSCH on the non-anchor PRB 660 (e.g., a non-anchor PRB for uplink). For the UE 102, the eNB 160 may transmit 601 a NPDCCH on a non-anchor PRB 660 (e.g., a non-anchor PRB for downlink), transmit a NPDSCH on the non-anchor PRB 660 (e.g., a non-anchor PRB for downlink), and/or receive a NPUSCH on the non-anchor PRB 660 (e.g., a non-anchor PRB for uplink). If the UE 102 triggers a scheduling request, the UE 102 may initiate 603 the random access procedure on the anchor PRB 602 (e.g., the random access procedure is initiated by the MAC sub-layer itself). If the UE 102 receives a PDCCH order (e.g., an NPDCCH order), the UE 102 may initiate 603 the random access procedure on the anchor PRB 602 (e.g., the random access procedure is initiated by the PDCCH order).

Once the random access procedure is initiated, the UE 102 may move 604 from the non-anchor PRB 660 to the anchor PRB 602. Once the random access procedure is initiated, the UE 102 may transmit 605 a Random Access Preamble on an NPRACH on the anchor PRB 602 (e.g., an anchor PRB for uplink) (e.g., Msg.1). After a transmission of the Random Access Preamble, the UE 102 may stop monitoring an NPDCCH on the non-anchor PRB 660, and monitor 604 an NPDCCH on anchor PRB 602 (e.g., an anchor PRB for downlink) (e.g., step 604 may be after step 605). Alternatively, once the random access procedure is initiated, the UE 102 may stop monitoring an NPDCCH on the non-anchor PRB 660, and monitor 604 an NPDCCH on the anchor PRB 602 (e.g., an anchor PRB for downlink). After a reception of the Random Access Preamble, the eNB 160 may transmit an NPDCCH on an anchor PRB 602 (e.g., an anchor PRB for downlink), transmit an NPDSCH on the anchor PRB 602 (e.g., an anchor PRB for downlink), and/or receive an NPUSCH on the anchor PRB 602 (e.g., an anchor PRB for uplink).

In the random access procedure, the UE 102 may monitor 607 the NPDCCH with CRC scrambled with a random access-RNTI (RA-RNTI) for a Random Access Response (e.g., Msg.2). The Random Access Response may be transmitted by the eNB 160 on an NPDSCH on the anchor PRB 602. If the Random Access Response contains a Random Access Preamble identifier corresponding to the transmitted Random Access Preamble, the MAC entity of UE may consider this Random Access Response reception successful and may process 609 the received UL grant value and indicate it the physical layer of the UE 102 (e.g., the Msg.3 is transmitted on an NPUSCH on the anchor PRB 602). Once Msg3 is transmitted, the UE 102 monitors the NPDCCH for a contention resolution. Once Msg3 is transmitted, if notification of a reception of a PDCCH (e.g., PDCCH, NPDCCH) transmission is received from lower layers, and if the C-RNTI MAC control element was included in Msg3, the UE 102 may consider a contention resolution successful in a case of the following condition.

In a first configuration, if the UE 102 is configured with an NB-IoT multi-carrier operation (e.g., configured with the second PRB) and if the Random Access procedure was initiated by the MAC sub-layer of the UE 102 itself or by the RRC sub-layer of the UE 102 and the PDCCH transmission (Msg.4) is addressed to the C-RNTI and contains an UL grant for a new transmission, the MAC entity of the UE 102 may 611 consider a contention resolution successful and consider this Random Access procedure successfully completed. The UE 102 may transmit an NPUSCH on anchor PRB based on the NPDCCH for the contention resolution containing the UL grant.

Alternatively, in a second configuration, if the UE 102 is configured with an NB-IoT multi-carrier operation (e.g., configured with the second PRB) and if the Random Access procedure was initiated by the MAC sub-layer of the UE 102 itself or by the RRC sub-layer of the UE 102 and the PDCCH transmission (Msg.4) is addressed to the C-RNTI and contains an UL grant for a new transmission or a DL assignment for a new transmission, the MAC entity of the UE 102 may 611 consider a contention resolution successful and consider this Random Access procedure successfully completed. The UE 102 may transmit an NPUSCH or receive an NPDSCH on anchor PRB 602 based on the NPDCCH for the contention resolution containing the UL grant or the DL assignment respectively. In the second configuration, even if this Random Access Procedure is initiated due to the scheduling request (e.g., UL data arrival), the eNB 160 may schedule DL-SCH carrying a RRC message including non-anchor PRB (re)configuration. Therefore, the NPDCCH for the DL assignment may be considered as the contention resolution. In a third configuration, "the PDCCH transmission (Msg.4) is addressed to the C-RNTI and contains an UL grant for a new transmission or a DL assignment for a new transmission" in the second configuration may be rephrased by "the PDCCH transmission (Msg.4) is addressed to the C-RNTI" or "the PDCCH transmission (Msg.4) is addressed to the C-RNTI and contains an UL grant for a new transmission or a DL assignment". For simplicity, in the third configuration, the PDCCH transmission is not limited to a new transmission.

If the UE 102 is configured with an NB-IoT multi-carrier operation (e.g., configured with the second PRB) and if the Random Access procedure was initiated by a PDCCH order and the PDCCH transmission (Msg.4) is addressed to the C-RNTI, the MAC entity of the UE 102 may 611 consider a contention resolution successful and consider this Random Access procedure successfully completed. The UE 102 may transmit an NPUSCH or receive an NPDSCH on anchor PRB 602 based on the NPDCCH on the anchor PRB 602 for the contention resolution containing the UL grant or the DL assignment respectively.

Figure 7:
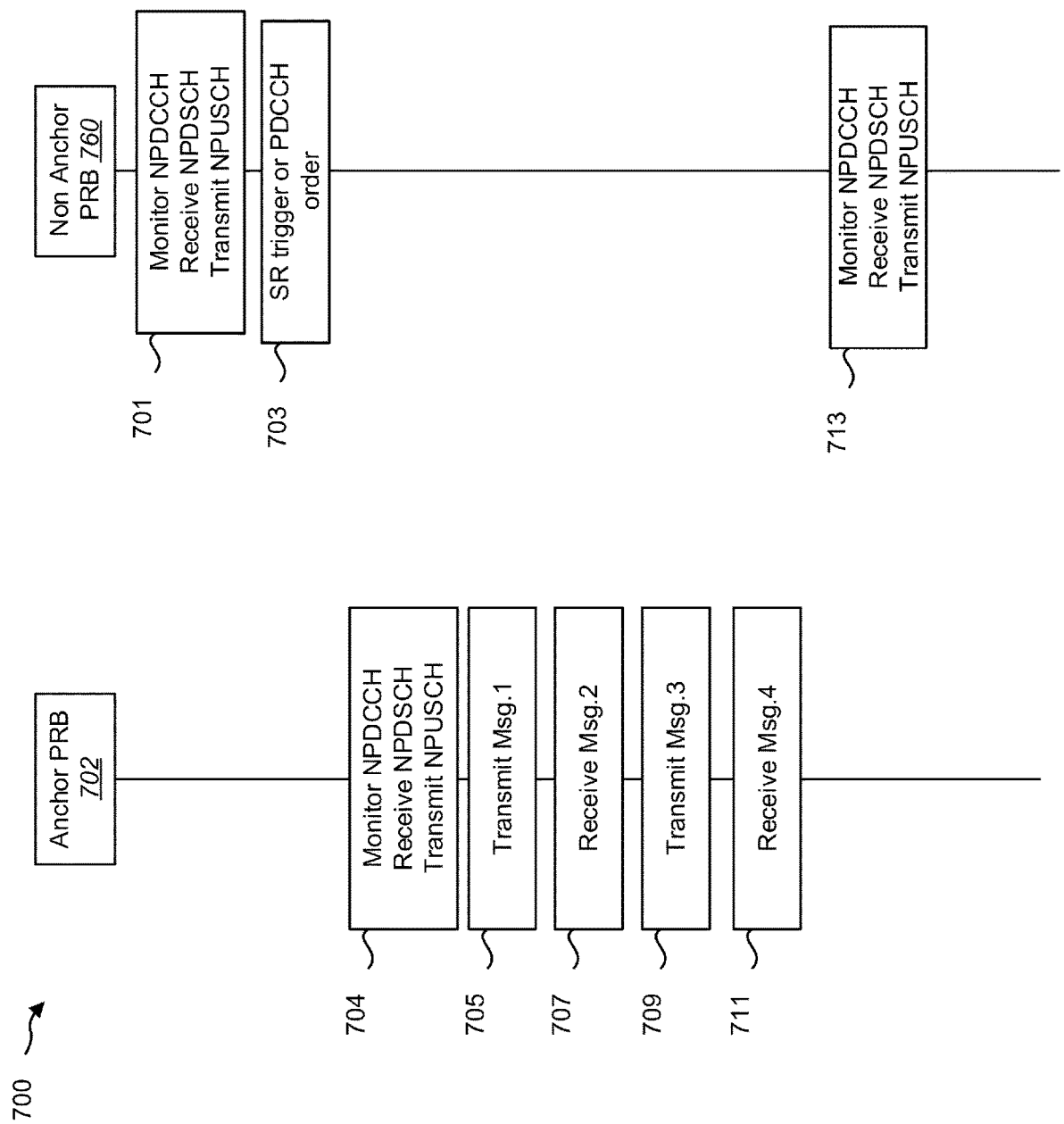
FIG. 7 is a thread diagram illustrating another configuration of a random access procedure in an NB-IoT multi-carrier operation.

FIG. 7 is a thread diagram illustrating another configuration of a random access procedure 700 in an NB-IoT multi-carrier operation. In this procedure, after a random access procedure, the UE 102 may move back to a non-anchor PRB 760. This procedure may be applied to a UE configured to use a first mode ("Data transfer over Non-Access Stratum (NAS)"). This procedure may be beneficial to the first mode because the first mode doesn't support a RRC connection reconfiguration procedure and the UE 102 cannot be reassigned the non-anchor PRB except for a RRC connection setup procedure. This procedure may or may not be applied to a UE configured to use the second mode ("AS context caching"). If the UE 102 is configured with an NB-IoT multi-carrier operation (e.g., configured with the second PRB), the UE 102 may monitor 701 an NPDCCH on a non-anchor PRB 770 (e.g., a non-anchor PRB for downlink), receive an NPDSCH on the non-anchor PRB 770 (e.g., a non-anchor PRB for downlink), and/or transmit an NPUSCH on the non-anchor PRB 770 (e.g., a non-anchor PRB for uplink). For the UE 102, the eNB 160 may transmit an NPDCCH on a non-anchor PRB 760 (e.g., a non-anchor PRB for downlink), transmit an NPDSCH on the non-anchor PRB 760 (e.g., a non-anchor PRB for downlink), and/or receive an NPUSCH on the non-anchor PRB 760 (e.g., a non-anchor PRB for uplink). If the UE 102 triggers a scheduling request, the UE 102 may initiate 703 the random access procedure on the anchor PRB 702 (e.g., the random access procedure is initiated by the MAC sub-layer itself). If the UE 102 receives a PDCCH order (e.g., an NPDCCH order), the UE 102 may initiate 703 the random access procedure on the anchor PRB 702 (e.g., the random access procedure is initiated by the PDCCH order).

Once the random access procedure is initiated, the UE 102 may move 704 from the non-anchor PRB 760 to the anchor PRB 702. Once the random access procedure is initiated, the UE 102 may transmit 705 a Random Access Preamble on an NPRACH on the anchor PRB 702 (e.g., an anchor PRB for uplink) (e.g., Msg.1). After a transmission of the Random Access Preamble, the UE 102 may stop monitoring an NPDCCH on the non-anchor PRB 760, and monitor 704 an NPDCCH on anchor PRB 702 (e.g., an anchor PRB for downlink) (e.g., step 704 may be after step 705). Alternatively, once the random access procedure is initiated, the UE 102 may stop monitoring an NPDCCH on the non-anchor PRB 760, and monitor 704 an NPDCCH on the anchor PRB 702 (e.g., an anchor PRB for downlink). After a reception of the Random Access Preamble, the eNB 160 may transmit an NPDCCH on an anchor PRB 702 (e.g., an anchor PRB for downlink), transmit an NPDSCH on the anchor PRB 702 (e.g., an anchor PRB for downlink), and/or receive an NPUSCH on the anchor PRB 702 (e.g., an anchor PRB for uplink).

In the random access procedure, the UE 102 may monitor 707 the NPDCCH with CRC scrambled with a random access-RNTI (RA-RNTI) for a Random Access Response (e.g., Msg.2). The Random Access Response may be transmitted on an NPDSCH on the anchor PRB 702. If the Random Access Response contains a Random Access Preamble identifier corresponding to the transmitted Random Access Preamble, the MAC entity of UE may consider this Random Access Response reception successful and may process 709 the received UL grant value and indicate it the physical layer of the UE 102 (e.g., the Msg.3 is transmitted on an NPUSCH on the anchor PRB 702). Once Msg3 is transmitted, the UE 102 monitors the NPDCCH for a contention resolution. Once Msg3 is transmitted, if notification of a reception of a PDCCH (e.g., PDCCH, NPDCCH) transmission is received from lower layers, and if the C-RNTI MAC control element was included in Msg3, the UE 102 may consider a contention resolution successful in a case of the following condition.

In a first configuration, if the UE 102 is configured with an NB-IoT multi-carrier operation (e.g., configured with the second PRB) and if the Random Access procedure was initiated by the MAC sub-layer of the UE 102 itself or by the RRC sub-layer of the UE 102 and the PDCCH transmission (Msg.4) is addressed to the C-RNTI and contains an UL grant for a new transmission, the MAC entity of the UE 102 may 611 consider a contention resolution successful and consider this Random Access procedure successfully completed. Once the Random Access procedure successfully completed, the UE 102 may move from the anchor PRB 702 to the non-anchor PRB 760. The UE 102 may stop monitoring the NPDCCH on the anchor PRB 702 and may monitor 713 the NPDCCH on the non-anchor PRB 760 (e.g., a non-anchor PRB for downlink). After the Random Access procedure successfully completed for the UE 102, the eNB 160 may transmit an NPDCCH on a non-anchor PRB 760 (e.g., a non-anchor PRB for downlink), transmit an NPDSCH on the non-anchor PRB 760 (e.g., a non-anchor PRB for downlink), and/or receive an NPUSCH on the non-anchor PRB 760 (e.g., a non-anchor PRB for uplink). The UE 102 may transmit an NPUSCH on the non-anchor PRB 760 based on the NPDCCH on the anchor PRB 702 for the contention resolution containing the UL grant. Alternatively, the UE 102 may transmit an NPUSCH on the anchor PRB 702 based on the NPDCCH on the anchor PRB 702 for the contention resolution containing the UL grant for new transmission, but for retransmission the UE 102 may transmit an NPUSCH on the non-anchor PRB 760 based on the NPDCCH on the non-anchor PRB 760 containing the UL grant for retransmission.

Alternatively, in a second configuration, if the UE 102 is configured with an NB-IoT multi-carrier operation (e.g., configured with the second PRB) and if the Random Access procedure was initiated by the MAC sub-layer of the UE 102 itself or by the RRC sub-layer of the UE 102 and the PDCCH transmission (Msg.4) is addressed to the C-RNTI and contains an UL grant for a new transmission or a DL assignment for a new transmission, the MAC entity of the UE 102 may 611 consider a contention resolution successful and consider this Random Access procedure successfully completed. Once the Random Access procedure successfully completed, the UE 102 may move from the anchor PRB 702 to the non-anchor PRB 760. The UE 102 may transmit an NPUSCH or receive an NPDSCH on non-anchor PRB 760 based on the NPDCCH on the anchor PRB 702 for the contention resolution containing the UL grant or the DL assignment respectively. The UE 102 may stop monitoring the NPDCCH on the anchor PRB 702 and may monitor 713 the NPDCCH on the non-anchor PRB 760 (e.g., a non-anchor PRB for downlink). After the Random Access procedure successfully completed for the UE 102, the eNB 160 may transmit an NPDCCH on a non-anchor PRB 760 (e.g., a non-anchor PRB for downlink), transmit an NPDSCH on the non-anchor PRB 760 (e.g., a non-anchor PRB for downlink), and/or receive an NPUSCH on the non-anchor PRB 760 (e.g., a non-anchor PRB for uplink). In the second configuration, even if this Random Access Procedure is initiated due to the scheduling request (e.g., UL data arrival), the eNB 160 may schedule DL-SCH carrying a RRC message including non-anchor PRB (re)configuration. Therefore, the NPDCCH for the DL assignment may be considered as the contention resolution. In a third configuration, "the PDCCH transmission (Msg.4) is addressed to the C-RNTI and contains an UL grant for a new transmission or a DL assignment for a new transmission" in the second configuration may be rephrased by "the PDCCH transmission (Msg.4) is addressed to the C-RNTI" or "the PDCCH transmission (Msg.4) is addressed to the C-RNTI and contains an UL grant for a new transmission or a DL assignment". For simplicity, in the third configuration, the PDCCH transmission is not limited to a new transmission.

If the UE 102 is configured with an NB-IoT multi-carrier operation (e.g., configured with the second PRB) and if the Random Access procedure was initiated by a PDCCH order and the PDCCH transmission (Msg.4) is addressed to the C-RNTI, the MAC entity of the UE 102 may consider 711 a contention resolution successful and consider this Random Access procedure successfully completed. The UE 102 may transmit an NPUSCH or receive an NPDSCH on non-anchor PRB 760 based on the NPDCCH on the anchor PRB 702 for the contention resolution containing the UL grant or the DL assignment respectively. After the Random Access procedure successfully completed for the UE 102, the eNB 160 may transmit an NPDCCH on a non-anchor PRB 760, transmit an NPDSCH on the non-anchor PRB 760, and/or receive an NPUSCH on the non-anchor PRB 760.

Figure 8:
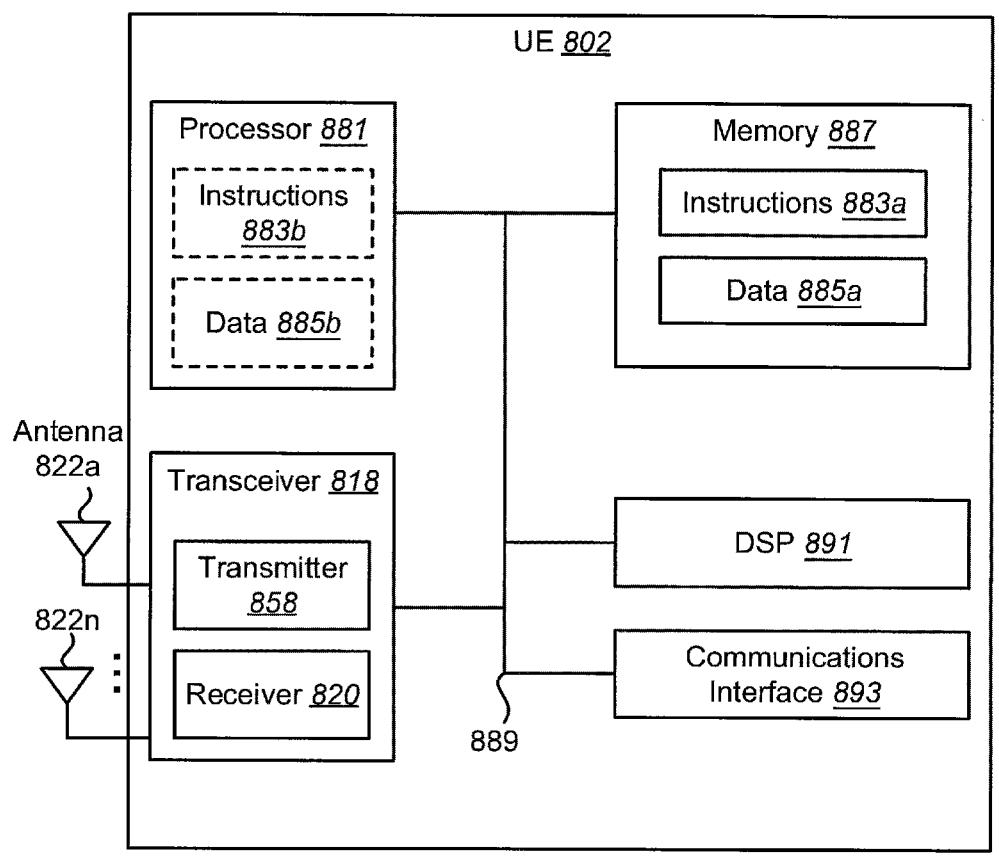
FIG. 8 illustrates various components that may be utilized in a UE.

FIG. 8 illustrates various components that may be utilized in a UE 802. The UE 802 described in connection with FIG. 8 may be implemented in accordance with the UE 102 described in connection with FIG. 1. The UE 802 includes a processor 881 that controls operation of the UE 802. The processor 881 may also be referred to as a central processing unit (CPU). Memory 887, which may include read-only memory (ROM), random access memory (RAM), a combination of the two or any type of device that may store information, provides instructions 883a and data 885a to the processor 881. A portion of the memory 887 may also include non-volatile random access memory (NVRAM). Instructions 883b and data 885b may also reside in the processor 881. Instructions 883b and/or data 885b loaded into the processor 881 may also include instructions 883a and/or data 885a from memory 887 that were loaded for execution or processing by the processor 881. The instructions 883b may be executed by the processor 881 to implement one or more of the methods 200 described above.

The UE 802 may also include a housing that contains one or more transmitters 858 and one or more receivers 820 to allow transmission and reception of data. The transmitter(s) 858 and receiver(s) 820 may be combined into one or more transceivers 818. One or more antennas 822a-n are attached to the housing and electrically coupled to the transceiver 818.

The various components of the UE 802 are coupled together by a bus system 889, which may include a power bus, a control signal bus and a status signal bus, in addition to a data bus. However, for the sake of clarity, the various buses are illustrated in FIG. 8 as the bus system 889. The UE 802 may also include a digital signal processor (DSP) 891 for use in processing signals. The UE 802 may also include a communications interface 893 that provides user access to the functions of the UE 802. The UE 802 illustrated in FIG. 8 is a functional block diagram rather than a listing of specific components.

Figure 9:
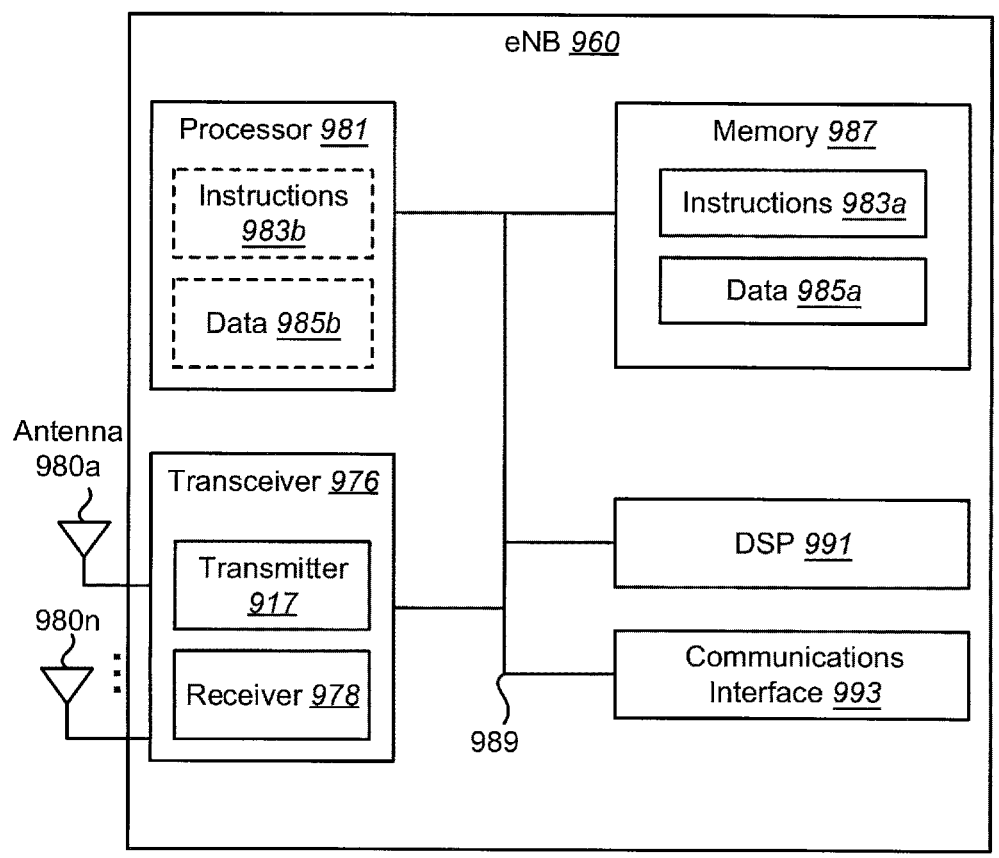
FIG. 9 illustrates various components that may be utilized in an eNB.

FIG. 9 illustrates various components that may be utilized in an eNB 960. The eNB 960 described in connection with FIG. 9 may be implemented in accordance with the eNB 160 described in connection with FIG. 1. The eNB 960 includes a processor 981 that controls operation of the eNB 960. The processor 981 may also be referred to as a central processing unit (CPU). Memory 987, which may include read-only memory (ROM), random access memory (RAM), a combination of the two or any type of device that may store information, provides instructions 983a and data 985a to the processor 981. A portion of the memory 987 may also include non-volatile random access memory (NVRAM). Instructions 983b and data 985b may also reside in the processor 981. Instructions 983b and/or data 985b loaded into the processor 981 may also include instructions 983a and/or data 985a from memory 987 that were loaded for execution or processing by the processor 981. The instructions 983b may be executed by the processor 981 to implement one or more of the methods 300 described above.

The eNB 960 may also include a housing that contains one or more transmitters 917 and one or more receivers 978 to allow transmission and reception of data. The transmitter(s) 917 and receiver(s) 978 may be combined into one or more transceivers 976. One or more antennas 980a-n are attached to the housing and electrically coupled to the transceiver 976.

The various components of the eNB 960 are coupled together by a bus system 989, which may include a power bus, a control signal bus and a status signal bus, in addition to a data bus. However, for the sake of clarity, the various buses are illustrated in FIG. 9 as the bus system 989. The eNB 960 may also include a digital signal processor (DSP) 991 for use in processing signals. The eNB 960 may also include a communications interface 993 that provides user access to the functions of the eNB 960. The eNB 960 illustrated in FIG. 9 is a functional block diagram rather than a listing of specific components.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray (registered trademark) disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

The invention claimed is:

1. A method performed by a user equipment (UE), comprising:
   performing a random access procedure;
   in the random access procedure,
   monitoring a narrowband physical downlink control channel (NPDCCH) in a first downlink (DL) frequency resource on a DL anchor carrier;
   detecting the NPDCCH in the first DL frequency resource on the DL anchor carrier;
   transmitting, to an evolved Node B (eNB), a narrowband physical uplink shared channel (NPUSCH) on a second uplink (UL) frequency resource on a UL non-anchor carrier based on detection of the NPDCCH on the first DL frequency resource, in a case that the NPDCCH contains a UL grant for contention resolution; and
   receiving, from the eNB, a narrowband physical downlink shared channel (NPDSCH) on a second DL frequency resource on a DL non-anchor carrier based on detection of the NPDCCH on the first DL frequency resource, in a case that the NPDCCH contains a DL assignment for contention resolution.

2. A method performed by an evolved Node B (eNB), comprising:
   performing a random access procedure;
   in the random access procedure,
   transmitting, to a user equipment (UE), a narrowband physical downlink control channel (NPDCCH) in a first downlink (DL) frequency resource on a DL anchor carrier;
   receiving, from the UE, a narrowband physical uplink shared channel (NPUSCH) on a second uplink (UL) frequency resource on a UL non-anchor carrier based on detection of the NPDCCH on the first DL frequency resource, in a case that the NPDCCH contains a UL grant for contention resolution; and
   transmitting, to the UE, a narrowband physical downlink shared channel (NPDSCH) on a second DL frequency resource on a DL non-anchor carrier based on detection of the NPDCCH on the first DL frequency resource, in a case that the NPDCCH contains a DL assignment for contention resolution.

3. A user equipment (UE), comprising:
   a processor; and
   a memory in electronic communication with the processor, wherein instructions stored in the memory are executable to:
   perform a random access procedure;
   in the random access procedure,
   monitor a narrowband physical downlink control channel (NPDCCH) in a first downlink (DL) frequency resource on a DL anchor carrier;
   detect the NPDCCH in the first DL frequency resource on the DL anchor carrier; and
   transmit, to an evolved Node B (eNB), a narrowband physical uplink shared channel (NPUSCH) on a second uplink (UL) frequency resource on a UL non-anchor carrier based on detection of the NPDCCH on the first DL frequency resource, in a case that the NPDCCH contains a UL grant for contention resolution; and
   receive, from the eNB, a narrowband physical downlink shared channel (NPDSCH) on a second DL frequency resource on a DL non-anchor carrier based on detection of the NPDCCH on the first DL frequency resource, in a case that the NPDCCH contains a DL assignment for contention resolution.

4. An evolved Node B (eNB), comprising:
a processor; and
a memory in electronic communication with the processor, wherein instructions stored in the memory are executable to:
perform a random access procedure;
in the random access procedure,
transmit, to a user equipment (UE), a narrowband physical downlink control channel (NPDCCH) in a first downlink (DL) frequency resource on a DL anchor carrier;
receive, from the UE, a narrowband physical uplink shared channel (NPUSCH) on a second uplink (UL) frequency resource on a UL non-anchor carrier based on detection of the NPDCCH on the first DL frequency resource, in a case that the NPDCCH contains a UL grant for contention resolution; and
transmit, to the UE, a narrowband physical downlink shared channel (NPDSCH) on a second DL frequency resource on a DL non-anchor carrier based on detection of the NPDCCH on the first DL frequency resource, in a case that the NPDCCH contains a DL assignment for contention resolution.

* * * * *